United States Patent
Meng et al.

(10) Patent No.: US 11,686,982 B2
(45) Date of Patent: Jun. 27, 2023

(54) ARRAY SUBSTRATE, DISPLAY PANEL AND DISPLAY DEVICE

(71) Applicant: BOE TECHNOLOGY GROUP CO., LTD., Beijing (CN)

(72) Inventors: Xiandong Meng, Beijing (CN); Jifeng Tan, Beijing (CN); Wei Wang, Beijing (CN); Qiuyu Ling, Beijing (CN); Xiaochuan Chen, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 18 days.

(21) Appl. No.: 17/274,928

(22) PCT Filed: Jul. 29, 2020

(86) PCT No.: PCT/CN2020/105594
§ 371 (c)(1),
(2) Date: Mar. 10, 2021

(87) PCT Pub. No.: WO2021/018219
PCT Pub. Date: Feb. 4, 2021

(65) Prior Publication Data
US 2022/0035207 A1      Feb. 3, 2022

(30) Foreign Application Priority Data
Jul. 31, 2019  (CN) .......................... 201910703835.6

(51) Int. Cl.
*G02F 1/1335* (2006.01)
*G02F 1/1343* (2006.01)
*F21V 8/00* (2006.01)

(52) U.S. Cl.
CPC ..... *G02F 1/134345* (2021.01); *G02B 6/0031* (2013.01); *G02B 6/0038* (2013.01); *G02F 1/133512* (2013.01)

(58) Field of Classification Search
None
See application file for complete search history.

(56) References Cited

U.S. PATENT DOCUMENTS

2007/0109489 A1* 5/2007 Nomura ............... G11B 7/1378
2015/0036084 A1  2/2015 Srivastava et al.
(Continued)

FOREIGN PATENT DOCUMENTS

CN       1982949       6/2007
CN     103543552      1/2014
(Continued)

OTHER PUBLICATIONS

PCT International Search Report (w/ English translation) for corresponding PCT Application No. PCT/CN2020/105594, dated Nov. 26, 2020, 8 pages.
(Continued)

*Primary Examiner* — Thanh Nhan P Nguyen
(74) *Attorney, Agent, or Firm* — Dority & Manning, P.A.

(57) ABSTRACT

A display panel includes: a first substrate and a second substrate; a liquid crystal layer located between the first substrate and the second substrate; pixel electrodes located on a side of the first substrate proximate to the liquid crystal layer; and a light-shielding pattern located on a side of the second substrate proximate to the liquid crystal layer. The second substrate has a light-shielding region shielded by the light-shielding pattern and light-exiting regions not shielded by the light-shielding pattern. A pixel electrode in the pixel electrodes is configured to converge light entering the pixel electrode from the first substrate; and the pixel electrode is used to control a deflection state of a liquid crystal in the liquid crystal layer, so that light passing through the pixel electrode is incident to the light-shielding pattern and/or a corresponding light-exiting region.

17 Claims, 9 Drawing Sheets

(56) References Cited

U.S. PATENT DOCUMENTS

| | | | | |
|---|---|---|---|---|
| 2015/0160508 A1* | 6/2015 | Kim | ............... | G02F 1/133526 |
| | | | | 349/200 |
| 2016/0085118 A1* | 3/2016 | Lee | ............... | G02F 1/134309 |
| | | | | 445/24 |
| 2016/0161807 A1 | 6/2016 | Li et al. | | |
| 2019/0204691 A1* | 7/2019 | Tan | ............... | G02F 1/133526 |
| 2020/0103697 A1 | 4/2020 | Tan | | |
| 2020/0233271 A1 | 7/2020 | Meng et al. | | |
| 2020/0285104 A1 | 9/2020 | Meng et al. | | |
| 2021/0333654 A1* | 10/2021 | Zhao | ............... | G02F 1/133512 |

FOREIGN PATENT DOCUMENTS

| | | |
|---|---|---|
| CN | 106773314 | 5/2017 |
| CN | 107238974 | 10/2017 |
| CN | 108717243 | 10/2018 |
| CN | 110412801 | 11/2019 |

OTHER PUBLICATIONS

Chinese First Office Action (w/ English translation) for corresponding Cn Application No. 201910703835.6, 12 pages.

* cited by examiner

US 11,686,982 B2

ARRAY SUBSTRATE, DISPLAY PANEL AND DISPLAY DEVICE

CROSS-REFERENCE TO RELATED APPLICATIONS

This application is a national phase entry under 35 USC 371 of International Patent Application No. PCT/CN2020/105594, filed on Jul. 29, 2020, which claims priority to Chinese Patent Application No. 201910703835.6, filed on Jul. 31, 2019, which are incorporated herein by reference in their entirety.

TECHNICAL FIELD

The present disclosure relates to the field of display technologies, and in particular, to an array substrate, a display panel and a display device.

BACKGROUND

A display device includes an array substrate, an opposite substrate and a liquid crystal layer located between the array substrate and the opposite substrate. By applying no voltage or different voltages to electrodes, a deflection state of a liquid crystal in the liquid crystal layer may be controlled, so as to realize different display states.

SUMMARY

In one aspect, a display panel is provided. The display panel includes: a first substrate and a second substrate; a liquid crystal layer located between the first substrate and the second substrate; pixel electrodes located on a side of the first substrate proximate to the liquid crystal layer; and a light-shielding pattern located on a side of the second substrate proximate to the liquid crystal layer. The second substrate has a light-shielding region shielded by the light-shielding pattern and light-exiting regions not shielded by the light-shielding pattern; a pixel electrode in the pixel electrodes is configured to converge light entering the pixel electrode from the first substrate; and the pixel electrode is used to control a deflection state of a liquid crystal in the liquid crystal layer, so that light passing through the pixel electrode is incident to the light-shielding pattern and/or a corresponding light-exiting region.

In some embodiments, the display panel has a plurality of sub-pixel units; and the pixel electrodes are located in the plurality of sub-pixel units in one-to-one correspondence; the pixel electrode includes a plurality of electrode strips arranged in a first direction, and two adjacent electrode strips have a gap therebetween; and widths of the plurality of electrode strips in the first direction gradually decrease from a center of the pixel electrode to edges of the pixel electrode.

In some embodiments, gaps of the pixel electrode are gradually widened from the center of the pixel electrode to the edges of the pixel electrode.

In some embodiments, the pixel electrode has a central axis, the central axis extends in a second direction, and the second direction is perpendicular to the first direction; the pixel electrode is symmetrical about the central axis.

In some embodiments, centered on the central axis, the pixel electrode sequentially includes a first electrode strip to a z-th electrode strip, and a j-th electrode strip is any one of the first electrode strip to the z-th electrode strip, where z is a natural number greater than 1, j is any natural number from 1 to z; a gap between the j-th electrode strip and a (j+1)-th electrode strip is referred to as a j-th gap; a width of the j-th electrode strip is denoted as d(j, 1), and the d(j, 1) meets following conditions:

a width d(1, 1) of the first electrode strip is equal to d(1, 1)=2×r(1, 1);

when j is a natural number greater than 1, the width d(j, 1) of the j-th electrode strip is equal to d(j, 1)=r(j, 1)−r(j−1, 2);

wherein $$r(j, 1) = \sqrt{(2j) \cdot f \cdot \lambda} \cdot \left(1 + \frac{(2j-1)^\lambda}{4 \cdot f}\right)^{1/2},$$

$$r(j, 2) = \sqrt{(2j) \cdot f \cdot \lambda} \cdot \left(1 + \frac{j^\lambda}{2 \cdot f}\right)^{1/2};$$

where r(j, 1) represents a distance from the central axis to a distal end of the j-th electrode strip; r(j, 2) represents a distance from the central axis to a proximal end of the (j+1)-th electrode strip; λ is a wavelength of the light; f=f1×n, and f1 is a distance from a surface of the pixel electrode proximate to the light-shielding pattern to a surface of the light-shielding pattern proximate to the pixel electrode along a thickness direction of the first substrate, and n is a refractive index of a liquid crystal.

In some embodiments, a width of the j-th gap is denoted as d(j, 2), and the d(j, 2) meets following conditions: the width d(j, 2) of the j-th gap is equal to d(j, 2)=r(j, 2)−r(j, 1).

In some embodiments, the plurality of electrode strips are equal in height.

In some embodiments, a height of electrode strips is denoted as h, and h=λ/[2×(n1−n2)]; where λ represents a wavelength of the light; n1 represents a refractive index of the pixel electrode: and n2 represents a refractive index of a filling medium filled in gaps between electrode strips.

In some embodiments, the pixel electrode further includes: a conductive connecting sheet disposed on a side of the electrode strips proximate to the first substrate, the conductive connecting sheet is connected to the plurality of electrode strips in the pixel electrode, and the conductive connecting sheet has a light-transmitting structure.

In some embodiments, the light-shielding pattern includes a first light-shielding portion located between two adjacent sub-pixel units, and a plurality of second light-shielding portions located in the plurality of sub-pixel units in one-to-one correspondence; and an orthographic projection in the second light-shielding portions of a second light-shielding portion on the first substrate is located within an outer border of an orthographic projection of a corresponding pixel electrode on the first substrate.

In some embodiments, the light is monochromatic light.

In some embodiments, the display panel further includes a common electrode and an insulating layer located between the pixel electrode and the common electrode.

In some embodiments, the first substrate is a light guide plate, and the display panel further includes light extraction gratings disposed on a side of the light guide plate proximate to the liquid crystal layer, and the pixel electrodes are located at a side of the light extraction gratings away from the light guide plate.

In some embodiments, the light extraction gratings are configured to make light in the light guide plate exit to the pixel electrodes in parallel with each other.

In some embodiments, the display panel further includes a planarization layer disposed on a side of the light extraction gratings away from the light guide plate; the planarization layer covers the light extraction gratings and the light guide plate, and a refractive index of the planarization layer is less than a refractive index of the light guide plate.

In some embodiments, outer borders of orthographic projections of the light extraction gratings on the first substrate are located within outer borders of orthographic projections of the pixel electrodes on the first substrate, respectively.

In another aspect, a display device is provided. The display device includes a light source and the display panel as described in any of the above embodiments.

In some embodiments, the display device further includes a reflective lampshade disposed at the light source, and the reflective lampshade has a free-form surface reflective layer.

In some embodiments, the light source includes a monochromatic light-emitting diode (LED) lamp.

In yet another aspect, an array substrate is provided. The array substrate includes a first substrate and pixel electrodes located on a side of the first substrate. A pixel electrode in the pixel electrodes is configured to converge light that enters the pixel electrode from the first substrate. The pixel electrode includes a plurality of electrode strips arranged in a first direction, and two adjacent electrode strips have a gap therebetween. Widths of the plurality of electrode strips in the first direction gradually decrease from a center of the pixel electrode to edges of the pixel electrode.

In some embodiments, gaps of the pixel electrode are gradually widened from the center of the pixel electrode to the edges of the pixel electrode.

BRIEF DESCRIPTION OF THE DRAWINGS

In order to describe technical solutions in the present disclosure more clearly, the accompanying drawings to be used in the description of some embodiments of the present disclosure will be introduced briefly. Obviously, the accompanying drawings to be described below are merely accompanying drawings of some embodiments of the present disclosure, and a person of ordinary skill in the art can obtain other drawings according to these drawings. In addition, the accompanying drawings in the following description can be regarded as schematic diagrams, and are not limitations on actual dimensions of products, actual processes of methods and actual timings of signals involved in the embodiments of the present disclosure.

DETAILED DESCRIPTION

Figure 1:
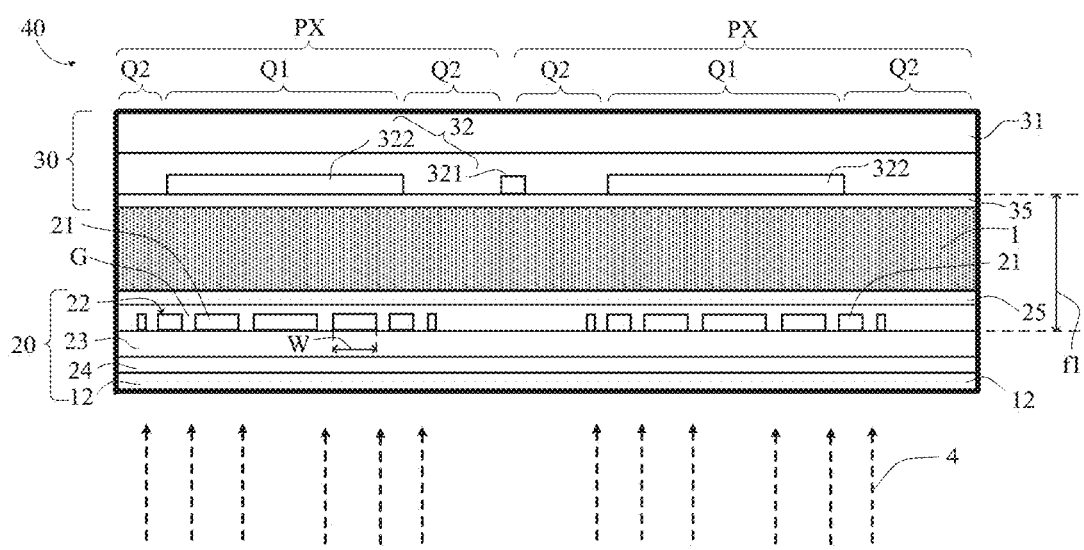
FIG. 1 is a sectional view showing a structure of a display panel in accordance with some embodiments.

Technical solutions in some embodiments of the present disclosure will be described clearly and completely with reference to the accompanying drawings. Obviously, the described embodiments are merely some but not all of embodiments of the present disclosure. All other embodiments obtained on a basis of the embodiments of the present disclosure by a person of ordinary skill in the art shall be included in the protection scope of the present disclosure.

Unless the context requires otherwise, the term "comprise" and other forms thereof such as the third-person singular form "comprises" and the present participle form "comprising" throughout the description and the claims are construed as an open and inclusive meaning, i.e., "including, but not limited to". In the description of the specification, the terms "one embodiment", "some embodiments", "exemplary embodiments", "an example" or "some examples" and the like are intended to indicate that specific features, structures, materials, or characteristics related to the embodiment or example are included in at least one embodiment or example of the present disclosure. Schematic representations of the above terms do not necessarily refer to the same embodiment(s) or example(s). In addition, the specific features, structures, materials, or characteristics described herein may be included in any one or more embodiments or examples in any suitable manner.

Terms such as "first" and "second" are only used for descriptive purposes, and are not to be construed as indicating or implying the relative importance or implicitly indicating the number of indicated technical features below. Thus, features defined by "first" and "second" may explicitly or implicitly include one or more of the features. In the description of the embodiments of the present disclosure, the term "a plurality of/the plurality of" means two or more unless otherwise specified.

In the description of some embodiments, the expressions such as "coupled" and "connected" and their extensions may be used. For example, the term "connected" may be used in the description of some embodiments to indicate that two or more components are in direct physical or electric contact with each other. For another example, the term "coupled" may be used in the description of some embodiments to indicate that two or more components are in direct physical or electric contact. However, the term "coupled" or "communicatively coupled" may also mean that two or more components are not in direct contact with each other, but still cooperate or interact with each other. The embodiments disclosed herein are not necessarily limited to the contents herein.

The phase "at least one of A, B and C" has the same meaning as the phase "at least one of A, B or C", and both include the following combinations of A, B and C: only A, only B, only C, a combination of A and B, a combination of A and C, a combination of B and C, and a combination of A, B and C.

The phrase "A and/or B" includes the following three combinations: only A, only B, and a combination of A and B.

The use of the phrase "applicable to" or "configured to" means an open and inclusive expression, which does not exclude devices that are applicable to or configured to perform additional tasks or steps.

Exemplary embodiments are described herein with reference to sectional views and/or plan views as idealized exemplary drawings. In the accompanying drawings, thicknesses of layers and regions are enlarged for clarity. Thus, variations in shape relative to the accompanying drawings due to, for example, manufacturing technologies and/or tolerances may be envisaged. Therefore, the exemplary embodiments should not be construed to be limited to the shapes of regions shown herein, but to include deviations in the shapes due to, for example, manufacturing. For example, an etched region shown in a rectangular shape generally has a curved feature. Therefore, the regions shown in the accompanying drawings are schematic in nature, and their shapes are not intended to show actual shapes of the regions in a device, and are not intended to limit the scope of the exemplary embodiments.

FIG. 1 is a schematic sectional view showing a structure of a display panel in accordance with some embodiments of the present disclosure.

As shown in FIG. 1, the display panel 40 includes a first substrate 12, a second substrate 31 and a liquid crystal layer 1 located between the first substrate 12 and the second substrate 31. Pixel electrodes 22 are provided on a side of the first substrate 12 proximate to the liquid crystal layer 1. A light-shielding pattern 32 is provided on a side of the second substrate 31 proximate to the liquid crystal layer 1, and the second substrate 31 has a light-shielding region Q1 shielded by the light-shielding pattern 32 and light-exiting regions Q2 not shielded by the light-shielding pattern 32. The light-shielding pattern 32 may be used to absorb light.

In one implementation, the pixel electrode is in a shape of a periodic grating bar, and when passing through the pixel electrodes, light emitted by a backlight will be dispersed through diffraction of the pixel electrodes, so that the light-shielding pattern 32 cannot shield all light, thereby causing dark state light leakage.

On this basis, in some embodiments of the present disclosure, the pixel electrode 22 is configured to converge light 4 that enters the pixel electrode 22 from the first substrate 12. It will be noted that the term "converge" mentioned here does not necessarily require light to be converged at one point, and as long as light beams can be narrowed to make an illuminated region smaller, it belongs to the "converge" mentioned here.

The convergence of light makes it possible that as long as a light-shielding pattern 32 with a smaller size is provided, it is enough to absorb all the light and avoid light leakage. The light-shielding pattern 32 with the small size is beneficial to increasing an aperture ratio of the display panel 40 and improving light efficiency.

By applying a voltage to the pixel electrode 22, an electric field may be formed at the liquid crystal layer 1 to control deflection of the liquid crystal in the liquid crystal layer 1, so that light passing through the pixel electrode 22 is incident to the light-shielding pattern 32 and/or the corresponding light-exiting region Q2.

Figure 2A:
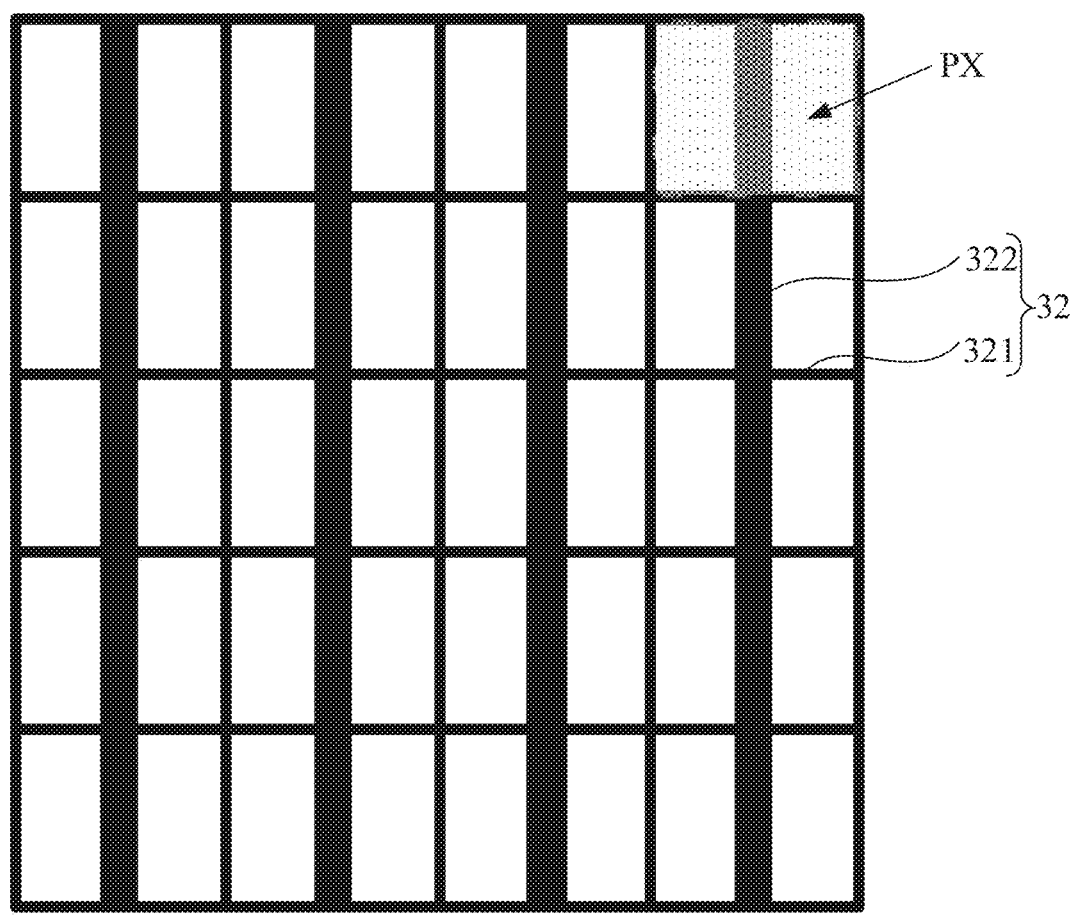
FIG. 2A is a structural diagram of a light-shielding pattern in accordance with some embodiments.
Figure 2B:
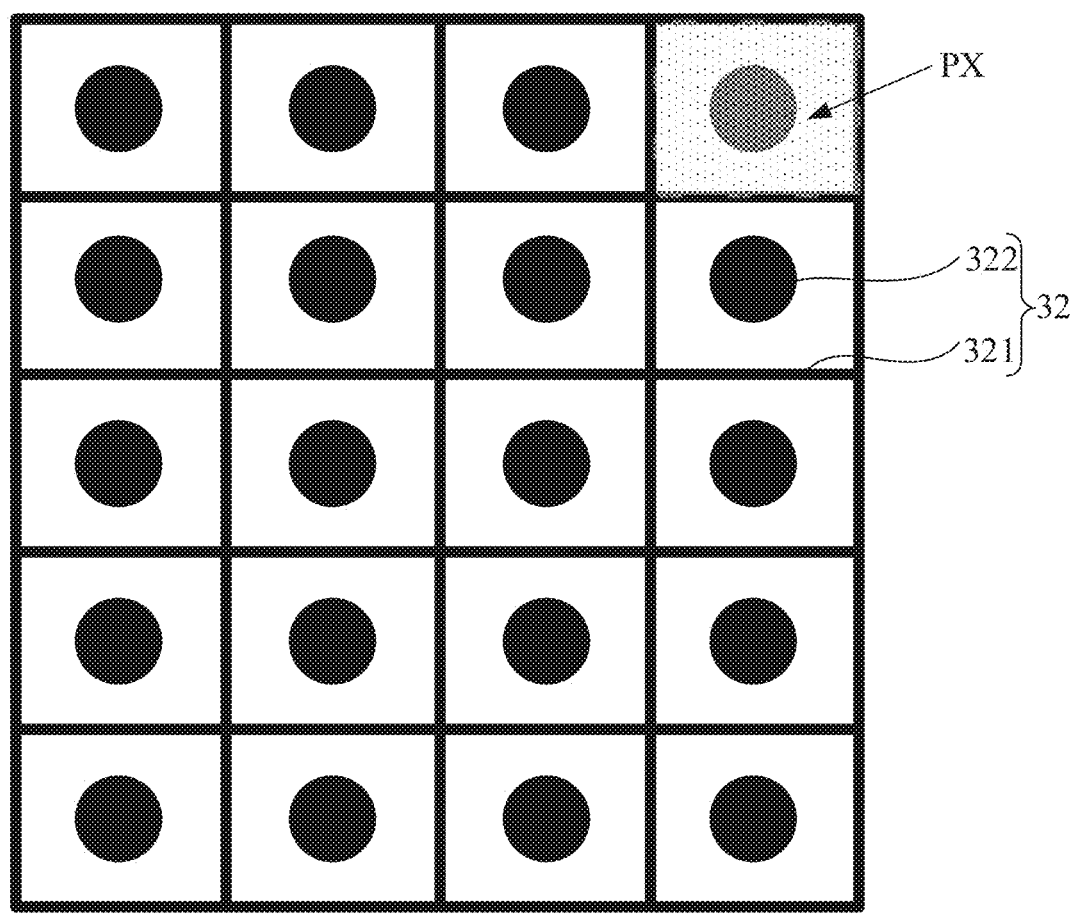
FIG. 2B is a structural diagram of another light-shielding pattern in accordance with some embodiments.

In some embodiments, referring to FIGS. 1, 2A and 2B, the display panel 40 has a plurality of sub-pixel units PX, and the light-shielding pattern 32 includes first light-shielding portions 321 each located between two adjacent sub-pixel units PX, and a plurality of second light-shielding portions 322 located in the plurality of sub-pixel units PX in one-to-one correspondence. A shape of a second light-shielding portion 322 is various. For example, the shape of the second light-shielding portion 322 may be a long strip shown in FIG. 2A. For another example, the shape of the second light-shielding portion 322 may also be a circle shown in FIG. 2B. The present disclosure is not limited thereto.

With continued reference to FIG. 1, the number of the pixel electrodes 22 is multiple, and the pixel electrodes 22 are located in the plurality of sub-pixel units PX in one-to-one correspondence. In at least one sub-pixel unit PX, an orthographic projection of the second light-shielding portion 322 on the first substrate 12 is located within an outer border of an orthographic projection of the pixel electrode 22 on the first substrate 12.

Figure 3A:
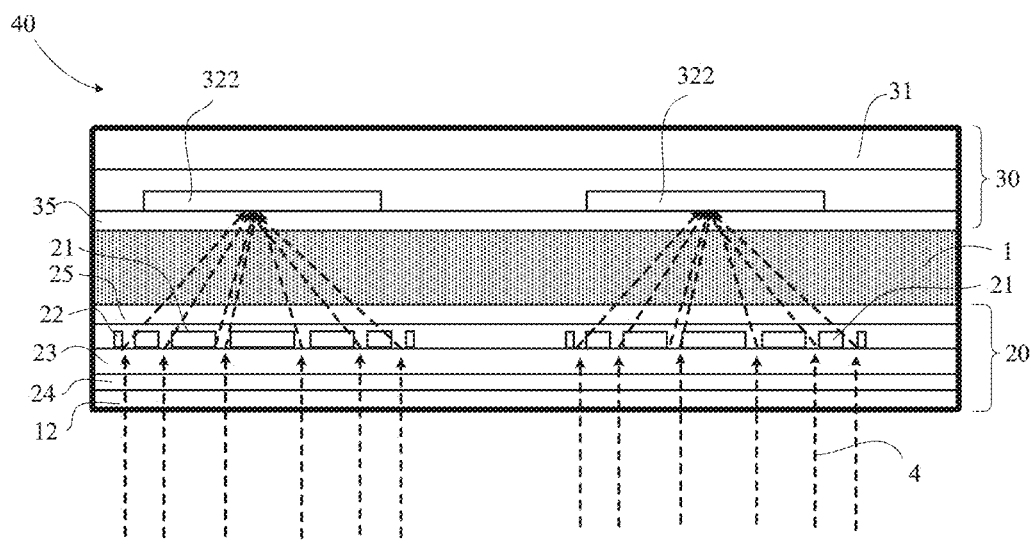
FIG. 3A is a schematic diagram of a display panel in a working state in accordance with some embodiments.
Figure 3B:
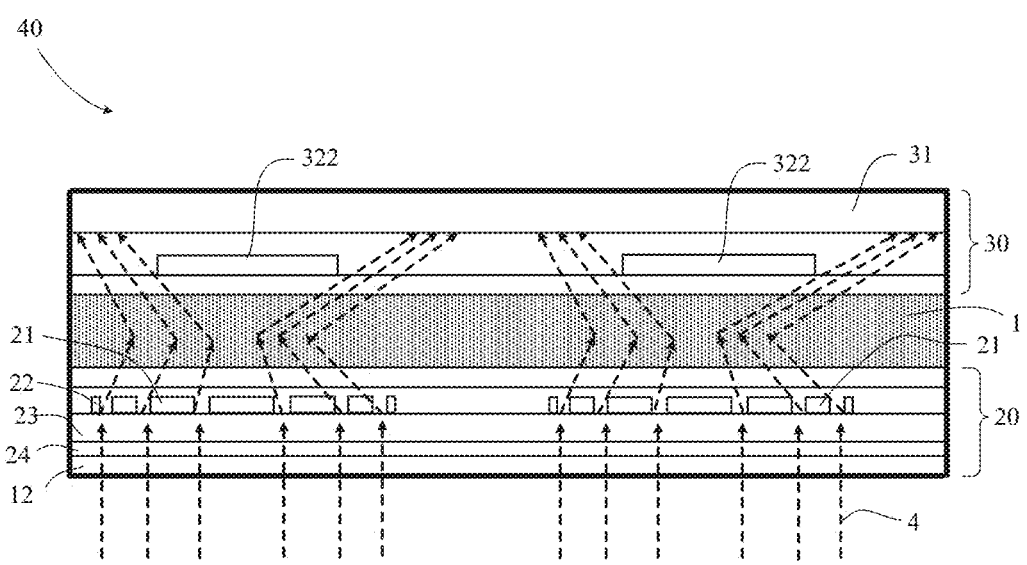
FIG. 3B is a schematic diagram of a display panel in another working state in accordance with some embodiments.

When no voltage is applied to the pixel electrode 22, the liquid crystal is not subject to an electric field force, and is not deflected. In this case, the liquid crystal does not shield light and does not interfere with the convergence of the light 4, and all the light 4 is converged to the second light-shielding portion 322 by the pixel electrode 22, as shown in FIG. 3A, which may avoid a light leakage phenomenon during a dark state display, and improve a contrast ratio (CR) of display. When a voltage is applied to the pixel electrode 22, the liquid crystal is deflected under action of the electric field force, and forms a liquid crystal grating. The liquid crystal grating re-disperses a part or all of the light 4 converged by the pixel electrode 22 to regions outside the second light-shielding portion 322, as shown in FIG. 3B, so as to realize a bright state display. Furthermore, by applying different voltages to the pixel electrode 22, different diffraction efficiencies of the liquid crystal grating to the light 4 may be achieved, and a plurality of grayscale displays may be achieved.

It is worth noting that in some other embodiments, the second light-shielding portion 322 may be disposed on a peripheral side above the pixel electrode 22, that is, the light-exiting region Q2 and the light-shielding region Q1 shown in FIG. 1 are reversed. In this way, when no voltage is applied to the pixel electrode 22, the liquid crystal is not subject to an electric field force and is not deflected. In this case, the liquid crystal does not shield light and does not interfere with the convergence of the light 4, and all the light 4 is converged to the light-exiting region Q2 by the pixel electrode 22, which is beneficial to increasing an amount of light emitted from the light-exiting region Q2, thereby enhancing an overall light-emitting brightness of the display panel. When a voltage is applied to the pixel electrode 22, the liquid crystal is deflected under action of the electric field force, and forms a liquid crystal grating. The liquid crystal grating disperses the light 4 converged by the pixel electrode 22 to the light-shielding region Q1. When a part of the light 4 is dispersed to the light-shielding region Q1, a plurality of grayscale displays may be achieved; when all the light 4 is dispersed to the light-shielding region Q1, a dark state display may be achieved.

The electric field applied to the liquid crystal layer 1 is provided by the pixel electrode 22 and the common electrode 24 together. In FIG. 1, the pixel electrode 22 and the common electrode 24 are formed on a same substrate (i.e., the first substrate 12). An insulating layer 23 is formed between the common electrode 24 and the pixel electrodes 22.

The common electrode 24 may be made of a transparent conductive material.

The pixel electrode 22 may be made of a transparent conductive material, but the present disclosure is not limited thereto. For example, the pixel electrode 22 may be made of an opaque conductive material.

Each pixel electrode 22 is connected to a source (or drain) of a thin film transistor, and a voltage is applied to the pixel electrode 22 through the thin film transistor. All common electrodes 24 are provided by a same metal layer. When voltages are applied to the pixel electrode 22 and the common electrode 24, an electric field, i.e., a fringe field, is formed between the common electrode 24 and the pixel electrode 22, and the liquid crystal in the liquid crystal layer 1 is deflected and forms a liquid crystal grating under driving of the fringe field.

The first substrate 12 is a part of an array substrate 20. The array substrate 20 is light-transmitting as a whole, and thus the light from the backlight may reach the liquid crystal layer 1 through the array substrate 20. The thin film transistor for driving the pixel electrode 22 is formed on the first substrate 12.

The second substrate 31 is a part of an opposite substrate 30. The opposite substrate 30 is also light-transmitting as a whole, and thus the light 4 passing through the liquid crystal layer 1 may further reach the outside (e.g., a user's eyes) through the opposite substrate 30. The second substrate 31 may be a glass plate, and the light-shielding pattern 32 is formed below the second substrate 31 (that is, the light-shielding pattern 32 is formed on a side of the second substrate 31 proximate to the liquid crystal layer 1).

For example, the opposite substrate 30 may be a color filter substrate. In this case, the opposite substrate 30 further includes a plurality of color filter portions spaced apart by the light-shielding pattern 32. In a sub-pixel unit PX, the light-exiting region Q2 corresponds to a color filter portion of one color, which may be, for example, any one of a red color filter portion, a green color filter portion and a blue color filter portion, so that color display may be achieved. For example, a material of the color filter portion may be a fluorescent material and/or a quantum dot material.

In some embodiments, as shown in FIG. 1, the color filter substrate 30 further includes a first alignment layer 35 located below the light-shielding pattern 32 (i.e., on a side of the light-shielding pattern 32 proximate to the liquid crystal layer 1), and the first alignment layer 35 is adjacent to an upper surface of the liquid crystal layer 1. The array substrate 20 further includes a second alignment layer 25 located above the pixel electrodes 22 (i.e., at a side of the pixel electrodes 22 proximate to the liquid crystal layer 1), and the second alignment layer 25 is adjacent to a lower surface of the liquid crystal layer 1.

In some examples, the liquid crystal in the liquid crystal layer 1 is selected from liquid crystals having a high refractive index difference to improve the light efficiency of the liquid crystal.

For example, the display panel 40 may include a plurality of sub-pixel units PX arranged in an array. FIG. 1 only exemplarily illustrates two of the plurality of sub-pixel units PX. Each sub-pixel unit PX has an independent pixel electrode 22 therein. Each sub-pixel unit PX is provided with at least one light-exiting region Q2 and a portion of the light-shielding region Q1.

Figure 4A:
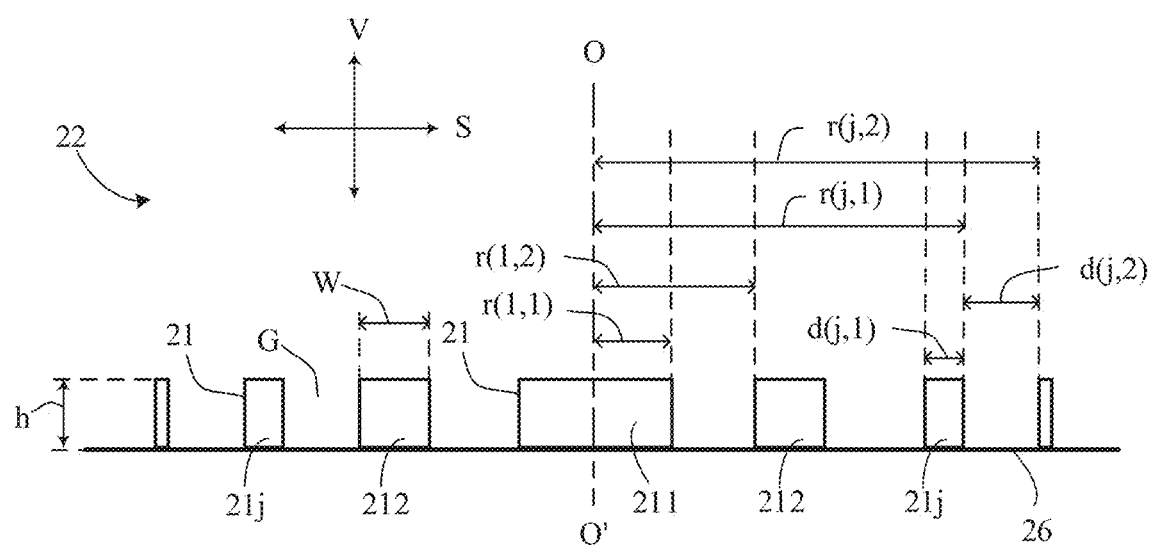
FIG. 4A is a sectional view showing a structure of a pixel electrode in accordance with some embodiments.

In some embodiments, referring to FIGS. 1 and 4A, in each sub-pixel unit PX, the pixel electrode 22 includes a plurality of electrode strips 21, and a gap G is provided between two adjacent electrode strips 21. Widths W of the plurality of electrode strips 21 in a first direction S gradually decrease from a center to edges of the pixel electrode 22. The pixel electrode 22 having the above shape is beneficial to enhancing the diffraction and convergence capability of the pixel electrode 22 to the light 4. Under action of the diffraction and convergence of the pixel electrode 22, the light 4 is concentrated in an extremely small region upon entering the liquid crystal layer 1. Correspondingly, light leakage may be avoided by only providing a second light-shielding portion 322 with a narrow width. The second light-shielding portion 322 with a narrow width is beneficial to increasing the aperture ratio of the display panel, thereby improving the light efficiency and increasing the display transparency.

In some embodiments, referring to FIGS. 1 and 4A, gaps G of the pixel electrode 22 are gradually widened from the center of the pixel electrode 22 to the edges of the pixel electrode 22. This arrangement is beneficial to enhancing the diffraction and convergence capability of the pixel electrode 22 to the light 4.

It will be noted that shapes of the plurality of electrode strips 21 in the pixel electrode 22 may be set according to light adjustment requirements. For example, the plurality of electrode strips 21 in the pixel electrode 22 may be configured in the manner shown in FIG. 4B or 4C. For another example, as shown in FIG. 4D, the pixel electrode 22 may include a circular electrode (i.e., a first electrode strip 211) in the middle, and a plurality of annular electrodes (e.g., a second electrode strip 212, a third electrode strip 213 and a fourth electrode strip 214, etc.) arranged in sequence around the circular electrode. In this case, by properly setting the widths of the electrode strips 21 and the gaps of the pixel electrode 22, the light may be converged into a smaller region.

In order to further optimize a diffraction and convergence effect of the pixel electrode 22 on the light, when the pixel electrode 22 is designed and manufactured, the widths of the electrode strips 21 in a same pixel electrode 22 may be further limited, but this limitation is not an essential condition for realizing the diffraction and convergence effect of the pixel electrode 22, and thus does not constitute a limitation on the present disclosure.

Figure 4B:
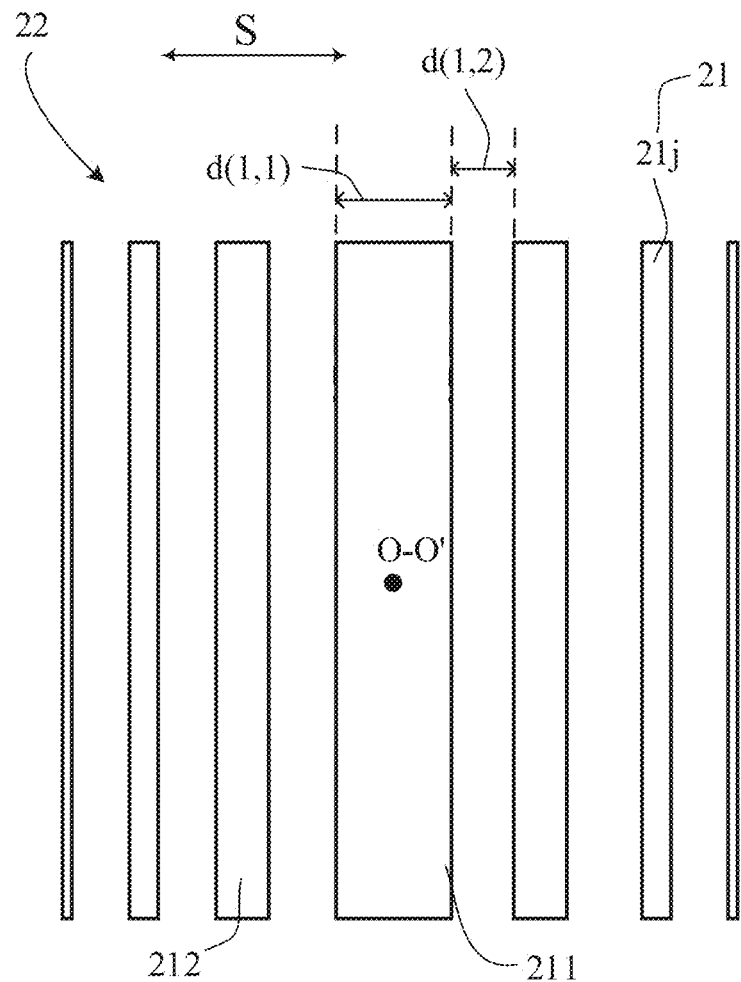
FIG. 4B is a top view showing a structure of a pixel electrode in accordance with some embodiments.
Figure 4C:
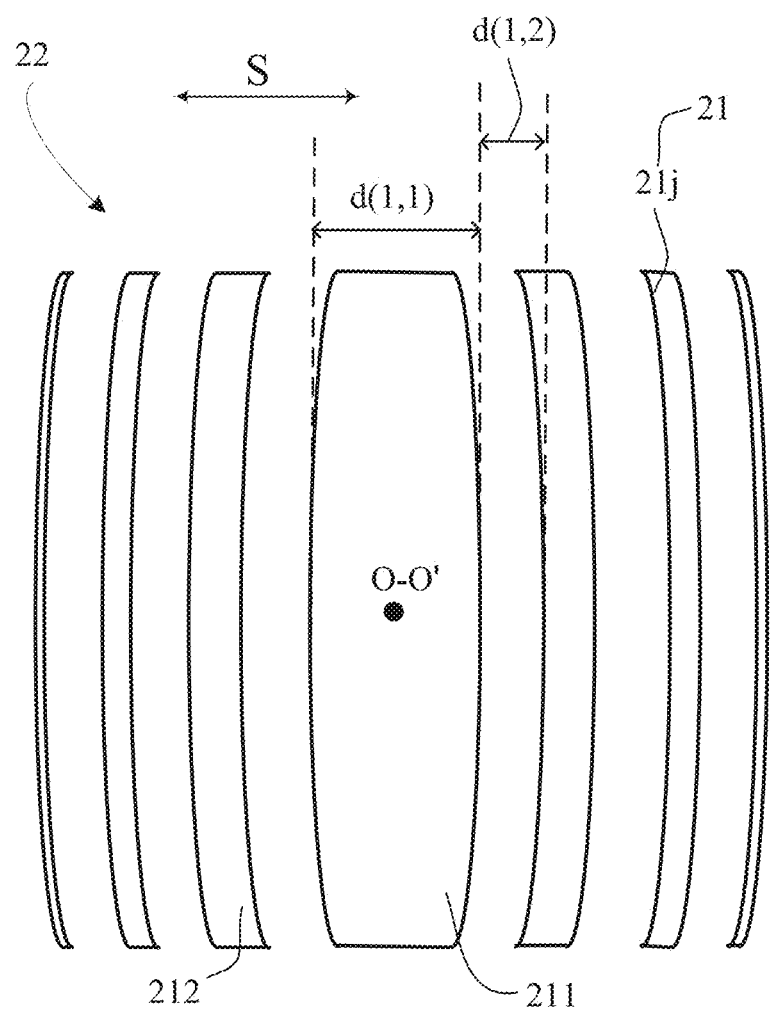
FIG. 4C is a top view showing a structure of another pixel electrode in accordance with some embodiments.
Figure 4D:
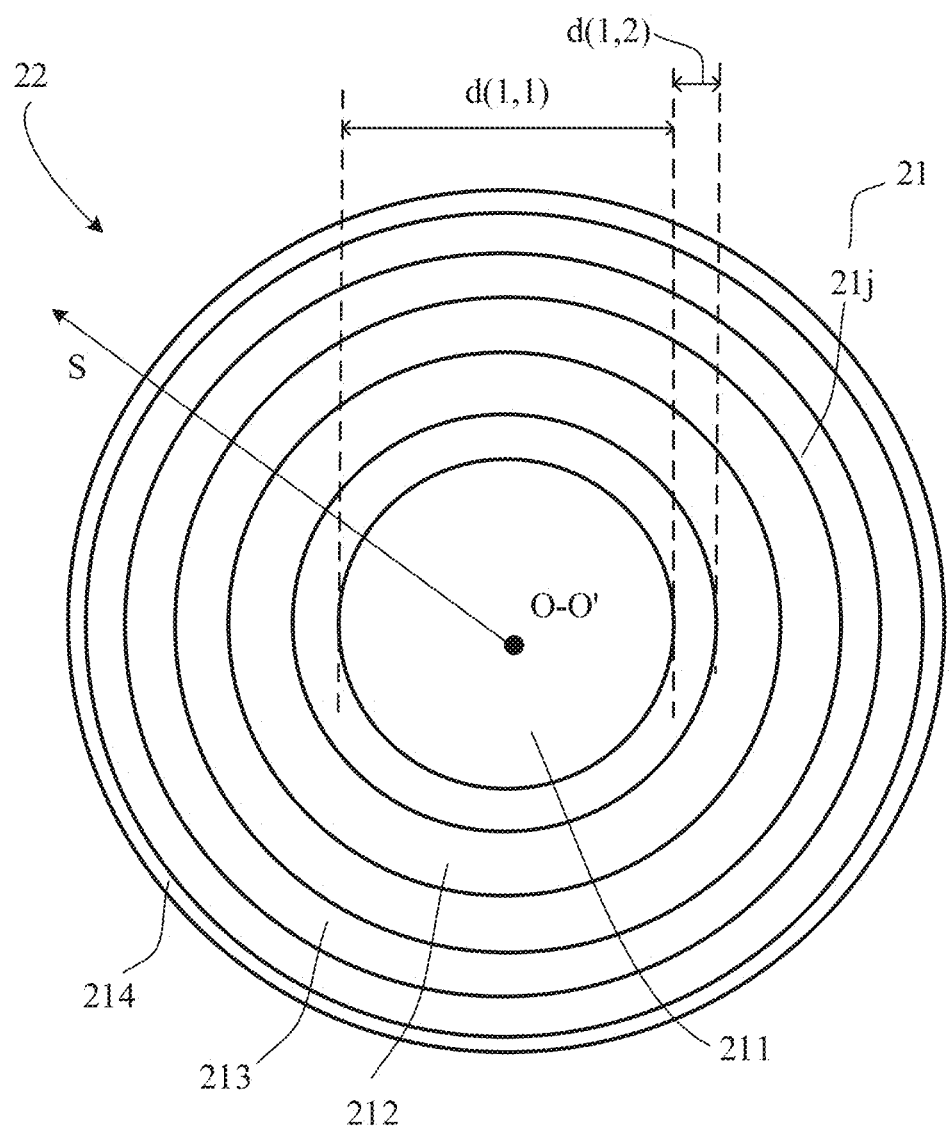
FIG. 4D is a top view showing a structure of yet another pixel electrode in accordance with some embodiments.

FIG. 4A is a schematic sectional view showing a structure of a pixel electrode in accordance with some embodiments of the present disclosure, and FIG. 4B is a schematic top view showing a structure of a pixel electrode in accordance with some embodiments of the present disclosure.

As shown in FIGS. 4A and 4B, the pixel electrode 22 has a central axis O-O', the central axis O-O' extends in a second direction V, and the second direction V is perpendicular to the first direction S. The pixel electrode 22 is axisymmetric, and the central axis O-O' is the symmetry axis. Centered on the central axis O-O', the pixel electrode 22 sequentially includes a first electrode strip 211 to a z-th electrode strip, and a j-th electrode strip 21j is any one of the first electrode strip 211 to the z-th electrode strip (here, for the pixel electrodes 22 shown in the FIGS. 4B and 4C, there are a total of (2z-1) electrode strips; for the pixel electrode 22 shown in FIG. 4D, there are a total of z electrode strips), where z is a natural number greater than 1, j is any natural number from 1 to z. The central axis O-O' passes through the center of the first electrode strip 211.

A gap between the j-th electrode strip and a (j+1)-th electrode strip is referred to as a j-th gap. For example, a gap between the first electrode strip and the second electrode strip is referred to as a first gap.

A width of the j-th electrode strip is denoted as d(j, 1), and a width of the gap between the j-th electrode strip and the (+1)-th electrode strip is denoted as d(j, 2). For example, a width of the first electrode strip is denoted as d(1, 1), and a width of the first gap between the first electrode strip and the second electrode strip is denoted as d(1, 2).

r(j, 1) is used to represent a distance from the central axis O-O' to a distal end of the j-th electrode strip 21j (a side of the j-th electrode strip 21j away from the central axis O-O'), and r(j, 2) is used to represent a distance from the central axis O-O' to a proximal end of the (j+1)-th electrode strip (a side of the (j+1)-th electrode strip proximate to the central axis O-O'). For example, r(1, 1) represents a distance from the central axis O-O' to a distal end of the first electrode strip 211 (a side of the first electrode strip 211 away from the central axis O-O'), and r(1, 2) represents a distance from the central axis O-O' to a distal end of the first gap (a side of the first gap away from the central axis O-O').

The width d(1, 1) of the first electrode strip 211 may be represented as: d(1, 1)=2×r(1, 1). When j is a natural number greater than 1, the width d(j, 1) of the j-th electrode strip 21*j* may be represented as: d(j, 1)=r(j, 1)−r(j−1, 2).

It has been verified that the diffraction and convergence effect of the pixel electrode 22 is optimal when values of r(j, 1) and r(j, 2) meet the following conditions:

$$r(j, 1) = \sqrt{(2j) \cdot f \cdot \lambda} \cdot \left(1 + \frac{(2j-1)^\lambda}{4 \cdot f}\right)^{1/2},$$

$$r(j, 2) = \sqrt{(2j) \cdot f \cdot \lambda} \cdot \left(1 + \frac{j^\lambda}{2 \cdot f}\right)^{1/2};$$

where j is a natural number greater than 0, λ is a wavelength of the light 4, f=f1×n, f1 is a distance from a lower surface of the pixel electrode 22 to a lower surface of the light-shielding pattern 32 along a thickness direction of the first substrate 12 (referring to FIG. 1), and n is a refractive index of the liquid crystal.

On this basis, in order to further optimize the diffraction and convergence effect of the pixel electrode 22 on the light, a height h of the electrode strips 21 of the pixel electrode 22 and/or widths of the gaps G between adjacent electrode strips 21 may be further limited, but this limitation is not an essential condition for realizing the diffraction and convergence effect of the pixel electrode 22, and thus does not constitute a limitation on the present disclosure.

As shown in FIG. 4A, heights of all electrode strips 21 are equal and are denoted as h. The width of the j-th gap between the j-th electrode strip and the (j+1)-th electrode strip is denoted as d(j, 2). For example, the width of the first gap between the first electrode strip and the second electrode strip is denoted as d(1, 2).

Then, the width d(j, 2) of the j-th gap can be represented as: d(j, 2)=r(j, 2)−r(j, 1).

It has been verified that the diffraction and convergence effect of the pixel electrode 22 is optimal when the values of r(j, 1) and r(j, 2) meet the following conditions:

$$r(j, 1) = \sqrt{(2j) \cdot f \cdot \lambda} \cdot \left(1 + \frac{(2j-1)^\lambda}{4 \cdot f}\right)^{1/2},$$

$$r(j, 2) = \sqrt{(2j) \cdot f \cdot \lambda} \cdot \left(1 + \frac{j^\lambda}{2 \cdot f}\right)^{1/2};$$

where r(j, 1) represents a distance from the central axis O-O' to a distal end of the j-th electrode strip 21*j* (a side of the j-th electrode strip 21*j* away from the central axis O-O');

r(j, 2) represents a distance from the central axis O-O' to a proximal end of the (j+1)-th electrode strip (a side of the (j+1)-th electrode strip proximate to the central axis O-O');

f=f1×n, f1 is a distance from the lower surface of the pixel electrode 22 to the lower surface of the light-shielding pattern 32 along a thickness direction of the first substrate 12, and n is a refractive index of the liquid crystal; and λ represents the wavelength of the light 4.

It has also been verified that the diffraction and convergence effect of the pixel electrode 22 is optimal when the height h of the electrode strips 21 is designed to meet the following conditions:

$$h = \lambda/[2 \times (n1 - n2)];$$

where:

λ represents the wavelength of the light 4;

n1 represents a refractive index of the pixel electrode 22;

n2 represents a refractive index of a filling medium filled in gaps between electrode strips 21.

In some embodiments, the light 4 reaching the pixel electrode 22 is collimated light (e.g., vertical light) and may be monochromatic light.

In some embodiments, as shown in FIG. 4A, the pixel electrode 22 further includes a conductive connecting sheet 26, and the plurality of electrode strips 21 in the pixel electrode 22 are connected as a whole by the conductive connecting sheet 26 below them. That is, each pixel electrode 22 includes a planar conductive connecting sheet 26 and a plurality of electrode strips 21 on the conductive connecting sheet 26. The conductive connecting sheet 26 has a light-transmitting structure, which allows light below to enter the gaps G between electrode strips 21. For example, the conductive connecting sheet 26 may be a light-transmitting metal connecting sheet.

FIG. 3A is a schematic diagram of the display panel 40 in a working state (dark state), and FIG. 3B is a schematic diagram of the display panel 40 in another working state (bright state).

Working processes of the display panel 40 in the dark state and in the bright state will be analyzed below with reference to FIGS. 3A and 3B to describe a principle that the display panel 40 does not leak light in the dark state and emits light in the bright state.

As shown in FIG. 3A, in the dark state, no voltage is applied to the pixel electrode 22, and no fringe field effect is formed in a region of the liquid crystal layer 1. In this case, the liquid crystal layer 1 may transmit light.

The light 4 passes through the first substrate 12, reaches the pixel electrode 22, and is diffracted and converged on the second light-shielding portion 322 by the pixel electrode 22. In this case, all the light is absorbed by the second light-shielding portions 322, and the display device achieves a dark state.

As shown in FIG. 3B, in the bright state, a voltage is applied to the pixel electrode 22, and a fringe field effect is formed in the region of the liquid crystal layer 1. The liquid crystal in the liquid crystal layer 1 is deflected to form a liquid crystal grating.

The light 4 passes through the first substrate 12, reaches the pixel electrode 22, and is diffracted and converged into the liquid crystal layer 1 by the pixel electrode 22, and then is dispersed through diffraction of the liquid crystal grating in the liquid crystal layer 1, so that the light converged by the pixel electrodes 22 are dispersed, the light is deflected to regions other than regions where the second light-shielding portions 322 are located, and the display device achieves a bright state.

In addition, a deflection angle of the liquid crystal in the liquid crystal layer 1 is related to an intensity of the fringe field effect. With different liquid crystal deflection angles, light transmission efficiencies of the liquid crystal grating are also different, and thus different gray scale displays of the same color may be realized.

Figure 5:
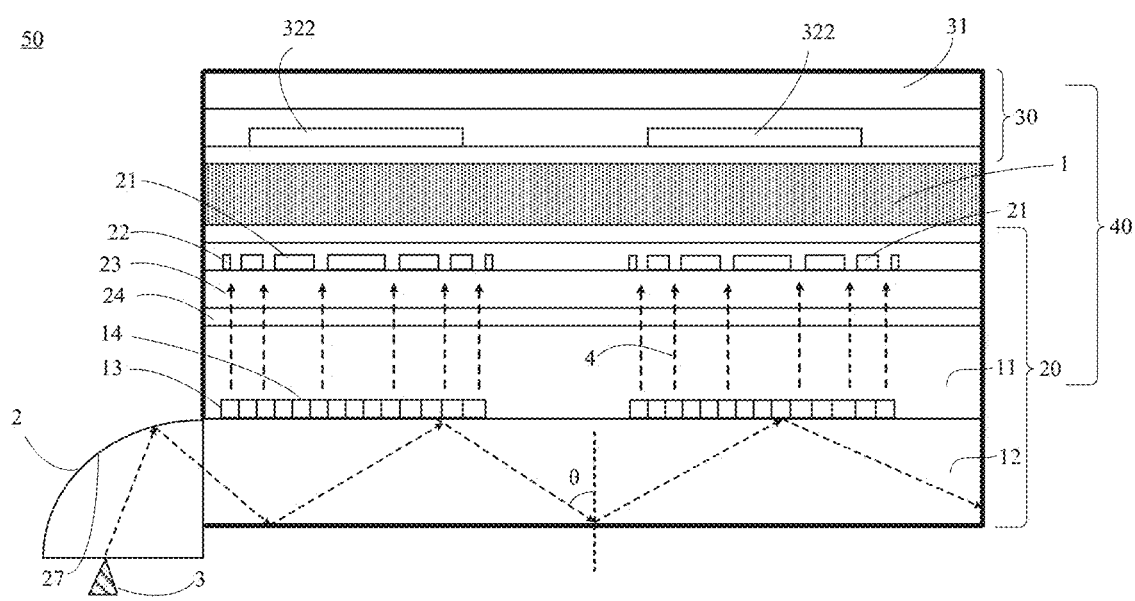
FIG. 5 is a sectional view showing a structure of a display device in accordance with some embodiments.

FIG. 5 is a schematic sectional view showing a structure of a display device in accordance with some embodiments of the present disclosure. The display device 50 includes a light source 3 for providing backlight and the display panel 40 as described above.

The first substrate 12 may also be used as a light guide plate. Light extraction gratings 13 are provided on a side of the first substrate 12 proximate to the liquid crystal layer 1 (i.e., an upper surface of the first substrate 12), and the pixel electrodes 22 are located at a side of the light extraction gratings 13 away from the light guide plate. The light extraction grating 13 is provided with light extraction openings 14 therein. The light extraction openings 14 are located on a surface of the first substrate 12 proximate to the liquid crystal layer 1 to allow light inside the first substrate 12 to enter the light extraction grating 13.

Since the pixel electrode 22 may diffract and converge a large area of light to a small region, a width of the light extraction opening 14 may be increased to improve light efficiency and increase display transparency.

For example, as shown in FIG. 5, the light extraction grating 13 is configured to make light in the light guide plate exit to the pixel electrode 22 in parallel with each other.

A structural design of the light extraction grating 13 meets the grating equation:

$$n3 \times \sin\theta - n4 \times \sin\theta1 = m \times (\lambda/P1);$$

where n3 is a refractive index of the light guide plate; n4 is a refractive index of a medium through which the light passes after exiting from the light guide plate; θ is a transmission angle of the light in the light guide plate (FIG. 5 is taken as an example, and the transmission angle is an included angle between the light and the vertical direction); θ1 is a diffraction angle, i.e., zero degree; m is the diffraction order; λ is the wavelength of the light; and P1 is a period of the grating.

With this arrangement, the light extraction grating 13 can be utilized to achieve travelling of collimated light to the pixel electrode 22.

A duty cycle and a groove depth of the light extraction grating 13 are optimal design parameters of diffraction efficiency, and may be optimally designed according to specific backlight efficiency and backlight uniformity.

In some examples, in order to ensure that the light passing through the light extraction grating 13 may be received by the pixel electrode 22, an outer border of an orthographic projection of the light extraction grating 13 on the first substrate 12 is located within an outer border of the orthographic projection of the pixel electrode 22 on the first substrate 12.

For example, a reflective lampshade 2 may be provided at the light source 3. The reflective lampshade 2 may have a free-form surface reflective layer 27 located above or on a peripheral side of the light source 3 to couple the light emitted by the light source 3 into the first substrate 12 at specific angles. The light travels in the first substrate 12 in a total reflection manner, and is finally incident onto the pixel electrode 22 above the light extraction grating 13 through the light extraction openings 14 of the light extraction grating 13 in a collimation and diffraction manner. The first substrate 12 and the light extraction grating 13 cooperate to collimate the light provided by the light source 3 and provide it to the pixel electrode 22.

For example, the light source 3 may include a monochromatic light-emitting diode (LED) lamp. As an embodiment, the light source 3 has small external dimensions and a narrow spectral width. For example, the light source 3 may be a micro-LED lamp or a micro organic light-emitting diode (micro-OLED) lamp. Smaller external dimensions of the light source are beneficial to ensuring a precise path of the light at positions of the reflective lampshade 2 and the first substrate 12. A narrow spectral width is beneficial to light extraction of the light extraction grating 13.

After the light extraction grating 13 is provided on the first substrate 12, for example, a planarization layer 11 may be covered on the first substrate 12 and the light extraction gratings 13. The planarization layer 11 may be a resin material layer, for example, may be made of a low refractive index resin. A portion of the planarization layer 11 covering the light extraction openings 14 of the light extraction grating 13 is beneficial to planarization of the light extraction grating 13, and a portion of the planarization layer 11 covering a portion of the light extraction grating 13 other than the light extraction openings 14 is beneficial to ensuring light lock capability of the first substrate 12.

In addition, it will be noted that the display device may be any component having a display function, such as a television, a digital camera, a mobile phone, a watch, a tablet computer, a notebook computer or a navigator.

The above descriptions are only specific implementations of the present disclosure, but the protection scope of the present disclosure is not limited thereto. Changes or replacements any person skilled in the art could conceive of within the technical scope of the present disclosure shall be included in the protection scope of the present disclosure. Therefore, the protection scope of the present disclosure shall be subject to the protection scope of the claims.

What is claimed is:

1. A display panel, comprising:
 a first substrate and a second substrate;
 a liquid crystal layer located between the first substrate and the second substrate;
 pixel electrodes located on a side of the first substrate proximate to the liquid crystal layer; and
 a light-shielding pattern located on a side of the second substrate proximate to the liquid crystal layer, wherein the second substrate has a light-shielding region shielded by the light-shielding pattern and light-exiting regions not shielded by the light-shielding pattern;
 a pixel electrode in the pixel electrodes is configured to converge light that enters the pixel electrode from the first substrate; and the pixel electrode is used to control a deflection state of a liquid crystal in the liquid crystal layer, so that light passing through the pixel electrode is incident to the light-shielding pattern and/or a corresponding light-exiting region;
 wherein the display panel has a plurality of sub-pixel units, and the pixel electrodes are located in the plurality of sub-pixel units in a one-to-one correspondence;
 the pixel electrode includes a plurality of electrode strips arranged in a first direction, and two adjacent electrode strips have a gap therebetween; and
 widths of the plurality of electrode strips in the first direction gradually decrease from a center of the pixel electrode to edges of the pixel electrode;
 wherein gaps between adjacent electrode strips of the pixel electrode are gradually widened from the center of the pixel electrode to the edges of the pixel electrode.

2. The display panel according to claim 1, wherein the pixel electrode has a central axis, the central axis extends in a second direction perpendicular to the first direction; and the pixel electrode is symmetrical about the central axis.

3. The display panel according to claim 2, wherein centered on the central axis, the pixel electrode sequentially includes a first electrode strip to a z-th electrode strip, and a j-th electrode strip is any one of the first electrode strip to the z-th electrode strip, wherein z is a natural number greater than 1, j is any natural number from 1 to z; a gap between the j-th electrode strip and a (j+1)-th electrode strip is referred to as a j-th gap; a width of the j-th electrode strip is denoted as d(j, 1), and the d(j, 1) meets following conditions:

a width d(1, 1) of the first electrode strip is d(1, 1)=2×r(1, 1);

when j is a natural number greater than 1, the width d(j, 1) of the j-th electrode strip is d(j, 1)=r(j, 1) −r(j−1, 2); wherein $$r(j, 1) = \sqrt{(2j) \cdot f \cdot \lambda} \cdot \left(1 + \frac{(2j-1)\lambda}{4 \cdot f}\right)^{1/2},$$

$$r(j, 2) = \sqrt{(2j) \cdot f \cdot \lambda} \cdot \left(1 + \frac{j\lambda}{2 \cdot f}\right)^{1/2},$$

wherein r(j, 1) represents a distance from the central axis to a distal end of the j-th electrode strip; r(j, 2) represents a distance from the central axis to a proximal end of the (j+1)-th electrode strip; λ is a wavelength of the light; f=f1×n, and f1 is a distance from a surface of the pixel electrode proximate to the light-shielding pattern to a surface of the light-shielding pattern proximate to the pixel electrode along a thickness direction of the first substrate, and n is a refractive index of the liquid crystal.

4. The display panel according to claim 3, wherein a width of the j-th gap is denoted as d(j, 2), and the d(j, 2) meets following condition:

the width d(j, 2) of the j-th gap is d(j, 2)=r(j, 2) −r(j, 1).

5. The display panel according to claim 1, wherein the plurality of electrode strips are equal in height.

6. The display panel according to claim 5, wherein the height of the electrode strips is denoted as h, and h=λ/[2× (n1−n2)];

wherein λ, represents a wavelength of the light;
n1 represents a refractive index of the pixel electrode; and
n2 represents a refractive index of a filling medium filled in the gaps between the adjacent electrode strips.

7. The display panel according to claim 1, wherein the pixel electrode further includes:

a conductive connecting sheet disposed on a side of the plurality of electrode strips proximate to the first substrate; the conductive connecting sheet is connected to the plurality of electrode strips in the pixel electrode, and the conductive connecting sheet has a light-transmitting structure.

8. The display panel according to claim 1, wherein the light-shielding pattern includes first light-shielding portions each located between two adjacent sub-pixel units, and a plurality of second light-shielding portions located in the plurality of sub-pixel units in a one-to-one correspondence; and an orthographic projection of a second light-shielding portion in the plurality of second light-shielding portions on the first substrate is located within an outer border of an orthographic projection of a corresponding pixel electrode on the first substrate.

9. The display panel according to claim 1, wherein the light is monochromatic light.

10. The display panel according to claim 1, further comprising a common electrode and an insulating layer located between the pixel electrodes and the common electrode.

11. The display panel according to claim 1, wherein the first substrate is a light guide plate, and the display panel further comprises:

light extraction gratings disposed on a side of the light guide plate proximate to the liquid crystal layer; and the pixel electrodes are located at a side of the light extraction gratings away from the light guide plate.

12. The display panel according to claim 11, wherein the light extraction gratings are configured to make light in the light guide plate exit to the pixel electrodes in parallel with each other.

13. The display panel according to claim 11, further comprising:

a planarization layer disposed on a side of the light extraction gratings away from the light guide plate, wherein the planarization layer covers the light extraction gratings and the light guide plate, and a refractive index of the planarization layer is less than a refractive index of the light guide plate.

14. The display panel according to claim 11, wherein outer borders of orthographic projections of the light extraction gratings on the first substrate are located within outer borders of orthographic projections of the pixel electrodes on the first substrate, respectively.

15. A display device, comprising a light source and the display panel according to claim 1.

16. The display device according to claim 15, further comprising:

a reflective lampshade disposed at the light source, the reflective lampshade having a free-form surface reflective layer.

17. An array substrate, comprising:

a first substrate, and
pixel electrodes located on a side of the first substrate; wherein a pixel electrode in the pixel electrodes is configured to converge light that enters the pixel electrode from the first substrate;
the pixel electrode includes a plurality of electrode strips arranged in a first direction, and two adjacent electrode strips have a gap therebetween; and
widths of the plurality of electrode strips in the first direction gradually decrease from a center of the pixel electrode to edges of the pixel electrode;
gaps between adjacent electrode strips of the pixel electrode are gradually widened from the center of the pixel electrode to the edges of the pixel electrode.

* * * * *